United States Patent
Scholtens et al.

(10) Patent No.: US 6,882,652 B1
(45) Date of Patent: Apr. 19, 2005

(54) PRIVATE LINES TRAVERSING A PACKET NETWORK AND RE-ARRANGEMENT OF CHANNELS AMONG PACKET NETWORK CONNECTIONS

(75) Inventors: Dale A. Scholtens, Stickney, IL (US); Michael J. Klemm, St. Louis Park, MN (US)

(73) Assignee: Tellabs Operations, Inc., Lisle, IL (US)

( * ) Notice: Subject to any disclaimer, the term of this patent is extended or adjusted under 35 U.S.C. 154(b) by 692 days.

(21) Appl. No.: 09/632,395

(22) Filed: Aug. 4, 2000

Related U.S. Application Data
(60) Provisional application No. 60/147,462, filed on Aug. 6, 1999.

(51) Int. Cl.[7] .......................... H04L 12/66; H04L 12/28
(52) U.S. Cl. ................... 370/401; 370/395.61; 370/432
(58) Field of Search ................................ 370/218, 228, 370/230, 235, 352–356, 395.1, 397, 395.3, 395.6, 395.61, 401, 432, 466, 227, 223

(56) References Cited

U.S. PATENT DOCUMENTS

| | | | |
|---|---|---|---|
| 5,434,854 A | * | 7/1995 | Focarile et al. ............. 370/335 |
| 5,805,588 A | * | 9/1998 | Petersen ...................... 370/356 |
| 5,809,011 A | * | 9/1998 | Almay ................... 370/395.32 |
| 5,825,780 A | | 10/1998 | Christie |
| 5,953,337 A | * | 9/1999 | Almay ..................... 370/395.6 |
| 5,991,301 A | | 11/1999 | Christie |
| 6,021,134 A | * | 2/2000 | Hiraiwa et al. ............. 370/474 |
| 6,023,465 A | * | 2/2000 | Brueckheimer et al. .... 370/386 |
| 6,023,474 A | | 2/2000 | Gardner et al. |
| 6,031,840 A | | 2/2000 | Christie et al. |
| 6,067,299 A | | 5/2000 | DuRee |
| 6,075,784 A | | 6/2000 | Frankel et al. |
| 6,169,735 B1 | * | 1/2001 | Allen et al. .................. 370/352 |
| 6,314,102 B1 | * | 11/2001 | Czerwiec et al. ......... 370/395.6 |
| 6,389,130 B1 | * | 5/2002 | Shenoda et al. ........ 379/221.08 |
| 6,658,008 B1 | * | 12/2003 | Hosein ................... 370/395.64 |
| 6,728,272 B1 | * | 4/2004 | Hosein ........................ 370/359 |
| 6,735,191 B1 | * | 5/2004 | Hosein ........................ 370/352 |

OTHER PUBLICATIONS

ITU–T Recommendation I.363.2, B–ISDN ATM Adaptation layer specification: Type d AAL (09/97).*

(Continued)

*Primary Examiner*—John Pezzlo
*Assistant Examiner*—Ahmed Elallam
(74) *Attorney, Agent, or Firm*—Fish & Richardson P.C.

(57) ABSTRACT

Techniques for providing communication services include provisioning a packet network connection that has packet channels, each of which is independently capable of carrying narrowband signals so as to emulate a private line circuit. A narrowband private line that traverses the packet network connection using a particular one of the packet channels is established. Delays that might otherwise be introduced as a result of packetizing the narrowband signals can be reduced. Private lines that traverse the packet network connection using other packet channels can be added or removed without adversely affecting the existing lines. Additionally, a narrowband communication line that traverses a channel in a first virtual circuit connection in a packet network can be rolled over to a channel in a second virtual circuit connection in the packet network. The latter technique can improve the use of available bandwidth and can be applied to non-private line applications as well.

15 Claims, 3 Drawing Sheets

OTHER PUBLICATIONS

ITU–T Recommendation I.366.2, AAL type 2 service specific cublayer for trunking (02/99).*

"A Generic ATM Trunking architecture for integration of PSTN/ISDN narrowband services", ATM Forum/99–0048, pp. 1–18 (Jan. 18, 1999).

"TITAN® 5500 High–speed Digital Cross–Connect Systems", TITAN 5500 ASIST User's Guide, Revision B, Tellabs Operations, Inc. (8/98).

J. Singer et al., "Narrowband Services Over ATM Networks: Evaluation of Trunking Methods," XVI World Telecom Congress Proc. (1997).

G. Eneroth et al., "ATM Transport in Cellular Networks," XVI World Telecom Congress Proc. (1997).

* cited by examiner

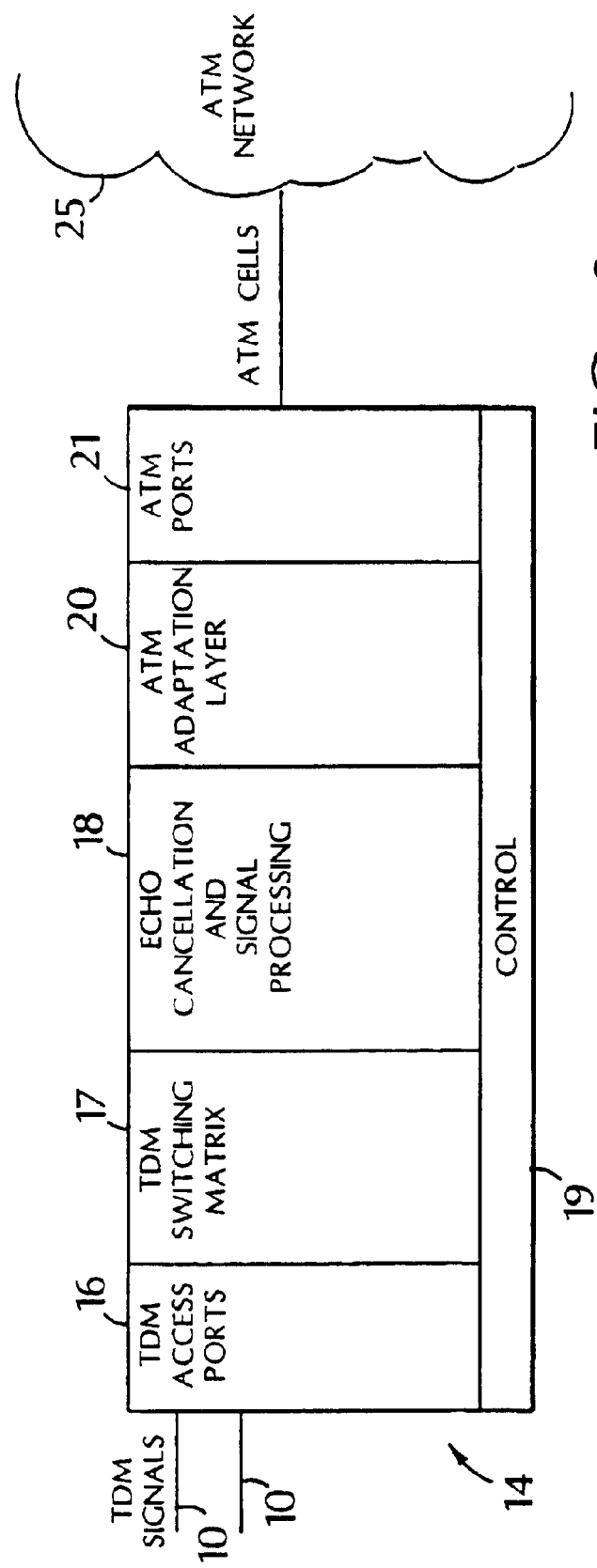

US 6,882,652 B1

PRIVATE LINES TRAVERSING A PACKET NETWORK AND RE-ARRANGEMENT OF CHANNELS AMONG PACKET NETWORK CONNECTIONS

CROSS REFERENCE TO RELATED APPLICATIONS

This application claims the benefit of priority of U.S. Provisional Patent Application No. 60/147,462, filed Aug. 6, 1999, and incorporated herein by reference.

BACKGROUND

The invention relates to private lines traversing a packet network and re-arrangement of channels among packet network connections.

A traditional telephone exchange configuration provides circuit connections between remote locations. Many of the telecommunications networks currently used are synchronous digital networks. Digitized voice communications are transmitted synchronously over the networks at a fixed rate. Discrete time periods (time slots) can be packed with the digital information for a particular call, and digital information for multiple calls can be packed sequentially to form a time division multiplexed (TDM) data stream.

Private lines, which are dedicated, non-switchable links from one or more customer-specified locations to other customer-specified locations, offer highly available connectivity because they are dedicated to the use of a single entity such as an organization. Private lines can provide a cost-effective alternative to usage-sensitive, switched services.

Traffic from private lines can traverse high-capacity, transmission facilities, including packet-domain network architectures. Asynchronous transfer mode (ATM) networks, for example, use fixed-size packets of data, known as cells, that are transferred between low-overhead packet switches and that provide virtual circuits between the end points of a network. The virtual circuits may be provisioned to provide a permanent virtual circuit between the end points.

One difficulty encountered in providing private line service over a packet network is that the packet network tends to induce additional delays during transmission of the private line traffic. Long delays may be unacceptable and can exacerbate echoes that interfere with the voice or other signals. Although echo cancellation techniques are available, they tend to be costly.

SUMMARY

According to one aspect, a method of providing communication services includes provisioning a packet network connection that has packet channels, each of which is independently capable of carrying narrowband signals so as to emulate a private line circuit. A narrowband private line that traverses the packet network connection using a particular one of the packet channels is established.

In various implementations, one or more of the following features may be present. A dedicated narrowband circuit can be associated with the particular packet channel. A dedicated narrowband circuit connection can be provided to a port of a gateway associated with the packet network connection, where the gateway is configured to perform adaptations between circuit-switched bearers and packet-switched bearers. Furthermore, additional narrowband private lines that traverse the packet network connection using other packet channels can be established without adversely affecting the existing lines.

In a related aspect, a method of providing communication services includes setting up multiple private narrowband lines associated with different entities. The private lines traverse a single virtual circuit in a packet network. Dedicated narrowband circuits can be associated with respective channels in the virtual circuit. Private lines traversing the virtual circuit can be removed without adversely affecting the remaining lines.

A communication system also is disclosed and includes gateways configured to perform adaptations between circuit-switched bearers and packet-switched bearers. A packet network includes a virtual circuit connection between a pair of the gateways, and the virtual circuit connection includes channels each of which is independently capable of carrying narrowband signals so as to emulate a private line circuit.

In some implementations, a dedicate narrowband circuit can be coupled to a port on one of the gateways in the pair to form a private line circuit traversing one of the channels in the virtual circuit connection. The system can include dedicated narrowband circuits associated with different entities and associated with different ones of the channels to form multiple private line circuits traversing a single virtual circuit connection.

In another aspect, a method of providing narrowband communication services includes rolling over a narrowband communication line that traverses a channel in a first virtual circuit connection in a packet network to a channel in a second virtual circuit connection in the packet network. The technique can be applied to private lines, although it is not limited to such applications. In some implementations, the method includes broadcasting traffic from a narrowband circuit that forms part of a private line. The traffic is broadcast over the channels in the first and second virtual circuit connections. Packets at a receiving end of the channel in the second virtual circuit connection are detected. Subsequently a path is established from the receiving end of the channel in the second virtual circuit connection to the narrowband circuit. Resources associated with the path from the receiving end of the narrowband circuit to the channel in the first virtual circuit connection then can be released.

In various implementations, one or more of the following advantages may be present. For example, private lines can more easily be adapted to packet networks. Delays that might otherwise be introduced on a private line as a result of packetizing the narrowband signals can be reduced by carrying the signals over a packet connection having multiple channels. Similarly, the need to employ echo cancellation techniques can be reduced. Furthermore, private lines can be added or removed from channels in the packet connection independently of one another.

Narrowband circuits within a packet network can be re-arranged without end-users perceiving transmission difficulties. The re-arrangement of packet channels can be applied to real-time traffic traversing packet networks, as well as private line services.

Other features and advantages will be readily apparent from the following detailed description, the accompanying drawings and the claims.

BRIEF DESCRIPTION OF THE DRAWINGS

FIG. 2 is a simplified block diagram of an exemplary media gateway.

DETAILED DESCRIPTION

Figure 1:
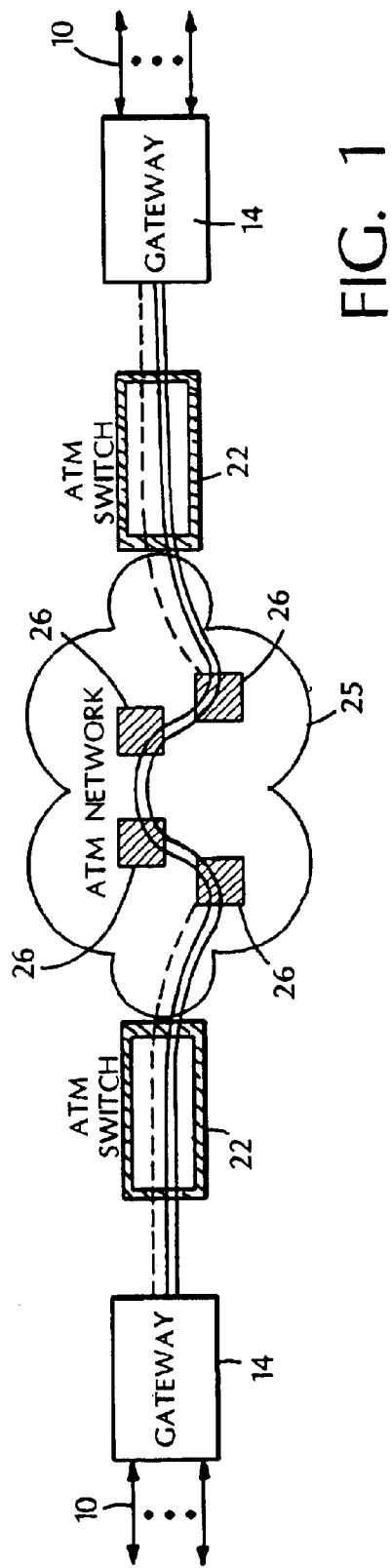
FIG. 1 is a block diagram of a telephone connection through a hybrid ATM network and an associated signaling network.

A large number of individual telephone circuits, such as DS0 circuits, can be carried, for example, on fiber optic carriers 10 using time-division multiplexing (TDM) according to the Telcordia Synchronous Optical Network (SONET) standards. The narrowband traffic associated with the DS0 circuits can include, for example, voice, modulated digital data from a modem, or facsimile machine data. The carriers 10 are coupled to access ports 16 in media gateways 14 (see FIG. 2).

The media gateways 14 adapt the narrowband telephone line signals to packet-based signals and vice-versa. Each gateway 14 can separate incoming TDM signals into individual DS0 signal streams. In one implementation, shown in FIG. 2, each gateway 14 includes a TDM switching matrix 17 that provides full switching capabilities. The switching matrices 17 permit the DS0 circuits to be interconnected flexibly with narrowband channels appearing on the media gateways 14. Echo cancellation and other digital signal processing functions can be performed in a digital signal processing portion 18 of each gateway. The DS0 streams are adapted by an ATM adaptation layer 20 into ATM cells. The ATM adaptation layer 20 combines incoming DS0 signals from a particular TDM carrier 10 into payloads for ATM cells. Each ATM cell is inserted through the ATM ports 21 into an ATM cell stream that traverses an ATM network 25. Each gateway 14 includes a control section 19 that controls overall operation of the gateway. In one implementation, the gateways 100A, 100B are implemented as Salix 7720 Class-Independent Switches available from Tellabs Operations, Inc.

As illustrated in FIG. 1, each gateway 14 is connected to an ATM end point switch 22. The connection between a gateway and an ATM end point switch 22 and the connection between the ATM end point switch and the ATM network 25 are user-network interfaces (UNIs). Within the ATM network 25, there are a number of ATM switches 26 which are inter-connected by network-node interfaces (NNIs).

As described in greater detail below, a single packet network connection has multiple channels each of which can emulate a private line circuit to help reduce the delay that otherwise might be associated with each circuit. The various packet channels can be associated with narrowband circuits independently of one another to allow private lines to be added or removed without impacting the integrity of the circuits already assigned to the packet network connection.

When a customer request is received for private line service between two locations, the service provider can install, for example, a T1 line carrying twenty-four DS0 circuits at each location. Gateways 14 having connections to the customer locations are provisioned to establish a virtual packet circuit with multiple channels through the ATM network 24. For example, in one implementation, the gateways 14 are provisioned to establish a virtual circuit with twenty-four independently assignable channels. The gateways 14 assign resources to handle the ATM cell stream. Each channel in the packet network connection is provisioned to be capable of carrying a TDM-based signal through the packet network 25 so as to emulate a private line circuit.

Once the packet-domain resources are assigned, dedicated circuit connections are provided between the customer locations through the gateways 14. The DS0 circuits are permanently assigned to an available gateway port 16 associated with the virtual circuit. Particular channels in the virtual circuit are assigned to the DS0 circuits to establish one or more narrowband private line connections between the customer locations through the packet network 25.

Additional private line circuits can be provided over the packet circuit at any time. To add another private line between customer locations, an available DS0 circuit would be assigned permanently to an available gateway port 16 associated with the virtual circuit in the ATM network 25. An available channel in the virtual circuit is assigned to the DS0 circuit to allow the new private line to traverse the packet network 25. In general, the channels in the virtual circuit can be provisioned to emulate private line circuits independently of one another, thereby permitting private lines from multiple customers to traverse a single virtual circuit in the packet network 25 without adversely affecting the existing connections. Similarly, one or more private lines traversing the virtual circuit can be removed without adversely impacting the integrity of the remaining DS0 circuits assigned to the virtual circuit.

From the service provider's perspective, individual private lines from multiple customers can be bundled for transport through the core packet network, and changes in one customer's line arrangement can be made without affecting service to other customer's sharing the bundle. Furthermore, by making a single packet connection available for multiple DS0 circuits, the additional delay (if any) resulting from the packet connection is distributed over the various channels in the virtual circuit. Therefore, from the user's perspective, private lines incur minimal additional transmission delays even though they are packetized for transmission over the service provider's core network. Additionally, where voice circuits are carried on the lines, the techniques can reduce or eliminate the need to deploy echo cancellers on ATM-adapted private lines because the delay characteristics of the lines are not appreciably changed.

In some implementations, a single private line may comprise multiple DS0 circuits. In that case, a narrowband. private line circuit can be established that traverses the packet network connection using multiple packet channels. For example, if a private line includes six DS0 circuits, then six channels in the packet network connection would be used to provide the corresponding DS0 circuit emulation.

Situations may arise where it is desirable to rearrange channels among the circuits in the packet network dynamically. In particular, it may be desirable to rearrange the channels so that one or more private lines traverse a different virtual circuit in the packet network. For example, assume that there are two virtual circuit connections between the gateways 14 through the ATM network 25 and that each virtual circuit connection includes twenty-four independently assignable channels. Assume further that all twenty-four channels in one of the virtual circuit connections form respective private line circuits, but that only one of the channels in the second virtual circuit is being used. At some later time, there may be a request to disconnect one of the DS0 circuits associated with a channel in the first virtual circuit in the packet network. In order to free up the unused bandwidth in the ATM network, it is desirable to rearrange the packet channels so that the private line traversing the channel in the second virtual circuit traverses the free channel in the first packet circuit instead. That allows the second virtual circuit to be released.

FIGS. 3A through 3D illustrate the rearrangement of a private line circuit. The private line starts on a DS0 circuit (A) and traverses a channel in the virtual circuit (B). As described below, the channels can be rearranged so that the private line circuit traverses an available channel in the virtual circuit (C). Although the technique is described with respect to a single gateway 14, the gateways on both sides of the virtual circuit connection (B) typically would be requested to perform the rollover from the virtual circuit (B) to the virtual circuit (C) substantially simultaneously. The gateways 14, however, may perform the rollover asynchronously.

Figure 3A:
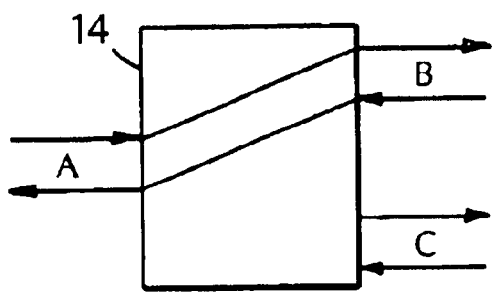
FIGS. 3A through 3D illustrate a technique for re-arranging channels among packet network connections.
Figure 3B:
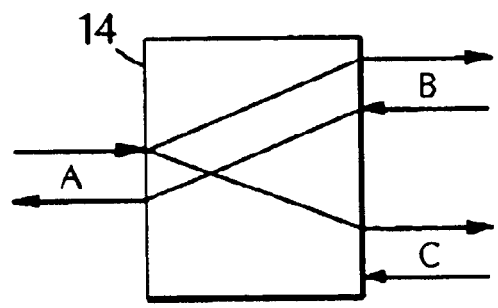
Figure 3C:
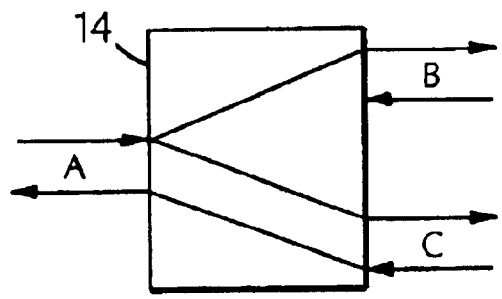
Figure 3D:
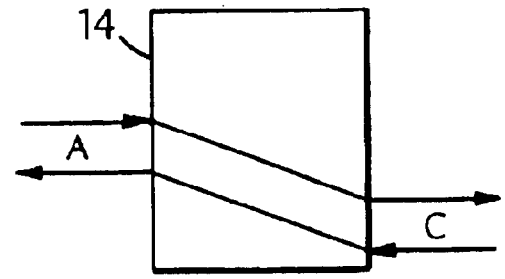

As shown in FIG. 3A, it is assumed that a private line narrowband circuit has been provisioned over the virtual circuit (B) and that the second virtual circuit (C) also exists. Each circuit includes incoming and outgoing paths with respect to the gateway 14. Upon receiving a request to reassign the DS0 circuit (A) to a channel in the virtual circuit (C), the gateway 14 bi-casts the traffic from the DS0 circuit (A) over both virtual circuits (B) and (C), as illustrated in FIG. 3B. The gateway 14 waits until it detects the presence of packets arriving at the receiving end of the specified channel in the virtual circuit (C). Once the gateway 14 detects the presence of packets arriving on the receiving end of the specified channel in the virtual circuit (C), the gateway reconfigures its resources to establish an incoming path from the particular channel in the virtual circuit (C) to the receiving side of the DS0 circuit (A), as shown in FIG. 3C. The gateway 14 also releases the resources that formed the incoming path from the channel in the virtual circuit (B) to the receiving end of the DS0 circuit (A).

In some cases, it may be desirable to send "out of service" patterns on unused packet channels. In that case, the gateway 14 would try to detect the arrival of packets having different patterns on the receiving end of the specified channel in the virtual circuit (C). Once the gateway 14 detects packets having patterns other than "out of service" patterns, it would reconfigure its resources to establish an incoming path from the particular channel in the virtual circuit (C) to the receiving side of the DS0 circuit (A).

The transition from the connection arrangement of FIG. 3B to that of FIG. 3C should occur quickly to reduce the possibility of interference on the private line that is detectable by the line-terminating equipment on the customer premises or by end-users themselves. Transition times on the order of fifty milliseconds are preferred. Such times are consistent with SONET protection switching times which are well-known in the art and avoid inducing customer-detectable problems. The gateway 14 then reconfigures its resources to remove the outgoing path from the DS0 circuit (A) to the channel in the virtual circuit (B).

During the rearrangement of channels in the packet circuits, other commands should not be executed with respect to the particular DS0 circuit that forms part of the private line until the rearrangement is completed. For example, a request to disconnect the DS0 circuit should be denied or delayed until after the channels have been rearranged.

The foregoing technique can be used to rearrange channels in packet circuits dynamically so as to maximize available bandwidth. Moreover, the technique can be performed transparently to users. The technique can be used, for example, to ensure efficient use of ATM Adaptation Layer 1 (AAL1) resources in a network of gateways 14. The technique can be particularly advantageous with respect to constant bit rate and real-time variable bit rate connections. Various types of packet networks can be used, including ATM, Internet Protocol (IP), frame relay and Ethernet.

Although the rearranging of channels in packet circuits has been described in the context of private lines that traverse packet networks, the technique can be applied to switched traffic as well.

The techniques can be used in systems employing "robbed" bit supervisory signaling as well as clear channel operation.

The foregoing techniques may include manual and/or automated provisioning of the various circuits. Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the claims.

What is claimed is:

1. A method of providing narrowband communication services comprising:

rolling over a narrowband communication line that traverses a channel in a first virtual circuit connection in a packet network to a channel in a second virtual circuit connection in the packet network, wherein the rolling over includes:

broadcasting traffic from a narrowband circuit over the channels in the first and second virtual circuit connections;

transmitting out-of-service patterns on unused channels in the second virtual circuit connection;

detecting packets having patterns other than out-of-service patterns; in the second virtual circuit connection and reconfiguring via rolling over to the first virtual circuit connection resources to establish an incoming path from the channel in the second virtual circuit connection to a receiving side of the narrowband circuit.

2. The method of claim 1 wherein the narrowband communication line is a private line.

3. The method of claim 1 including:

detecting packets at a receiving end of the channel in the second virtual circuit connection, wherein the packets contain information representative of an association between one of the channels and the narrowband circuit;

establishing a path from the receiving end of the channel in the second virtual circuit connection to the narrowband circuit; and releasing resources associated with a path from a receiving end of the narrowband circuit to the channel in the first virtual circuit connection.

4. The method of claim 1 wherein rolling over the narrowband communication line to the channel in the second virtual circuit connection is transparent to end-users.

5. The method of claim 1 including reassigning a telephone circuit from the channel in the first virtual circuit connection to the channel in the second virtual circuit connection.

6. The method of claim 1 wherein the rolling over occurs in response to receiving a request to reassign the narrowband circuit from the channel in the first virtual circuit connection to the channel in the second virtual circuit connection.

7. An article comprising a machine-readable storage medium for storing machine-executable instructions for causing a system to roll over a private line that traverses a channel in a first virtual circuit connection in a packet network to a channel in a second virtual circuit connection in the packet network, wherein the rolling over includes:

broadcasting traffic from a narrowband circuit forming part of the private line over the channels in the first and second virtual circuit connections transmitting out-of-service patterns on unused channels in the second virtual circuit connection;

detecting packets having patterns other than out-of-service patterns; in the second virtual circuit connection and reconfiguring via rolling over to the first virtual circuit connection resources to establish an incoming path from the channel in second virtual circuit connection to a receiving side of the narrowband circuit.

8. The article of claim 7 including instructions for causing the system to:

detect packets at a receiving end of the channel in the second virtual circuit connection, wherein the packets contain information representative of an association between one of the channels and the narrowband circuit; and establish a path from the receiving end of the channel in the second virtual circuit connection to the narrowband circuit.

9. The article of claim 7 including instructions for causing the system to release resources associated with a path from a receiving end of the narrowband circuit to the channel in the first virtual circuit connection.

10. The article of claim 7 including instructions for causing the system to:

reassign a telephone circuit from the channel in the first virtual circuit connection to the channel in the second virtual circuit connection.

11. The article of claim 7 wherein the rolling over occurs in response to receiving a request to reassign the narrowband circuit from the channel in the first virtual circuit connection to the channel in the second virtual circuit connection.

12. An apparatus including a gateway adapted to roll over a private line that traverses a channel in a first virtual circuit connection in a packet network to a channel in a second virtual circuit connection in the packet network, wherein the rolling over includes:

broadcasting traffic from a narrowband circuit forming part of the private line over the channels in the first and second virtual circuit connections;

transmitting out-of-service patterns on unused channels in the second virtual circuit connection;

detecting packets having patterns other than out-of-service patterns; in the second virtual circuit connection and reconfiguring via rolling over to the first virtual circuit connection resources to establish an incoming path from the channel in second virtual circuit connection to a receiving side of the narrowband circuit.

13. The apparatus of claim 12 wherein the gateway is adapted to:

detect packets at a receiving end of the channel in the second virtual circuit connection, wherein the packets contain information representative of an association between one of the channels and the narrowband circuit; and establish a path from the receiving end of the channel in the second virtual circuit connection to the narrowband circuit.

14. The apparatus of claim 12 wherein the gateway is adapted to release resources associated with a path from a receiving end of the narrowband circuit to the channel in the first virtual circuit connection.

15. The apparatus of claim 12 wherein the gateway is adapted to perform the rolling over in response to receiving a request to reassign the narrowband circuit from the channel in the first virtual circuit connection to the channel in the second virtual circuit connection.

\* \* \* \* \*

UNITED STATES PATENT AND TRADEMARK OFFICE
CERTIFICATE OF CORRECTION

PATENT NO. : 6,882,652 B1  Page 1 of 1
APPLICATION NO. : 09/632395
DATED : April 19, 2005
INVENTOR(S) : Dale A. Scholtens and Michael J. Klemm It is certified that error appears in the above-identified patent and that said Letters Patent is hereby corrected as shown below:

Col. 6, claim 1, line 36, "service patterns; in the second virtual circuit connection" should be --service patterns in the second virtual circuit connection;--;

Col. 6, claim 1, line 38, "reconfiguring via rolling over to the first virtual circuit" should be --reconfiguring, via rolling over the first virtual circuit--;

Col. 6, claim 1, line 39, "connection resources to establish an incoming path" should be --connection resources, to establish an incoming path--;

Col. 7, claim 7, line 13, "service patterns; in the second virtual circuit connectioin" should be --service patterns in the second virtual circuit connection;--;

Col. 7, claim 7, line 16, "reconfiguring via rolling over to the first virtual circuit" should be --reconfiguring, via rollover over the first virtual circuit--;

Col. 7, claim 7, line 17, "connection resources to establish an incoming path" should be --connection resources, to establish an incoming path--;

Col. 8, claim 12, line 14, "service patterns; in the second virtual circuit connection" should be --service patterns in the second virtual circuit connection;--;

Col. 8, claim 12, line 16, "reconfiguring via rolling over to the first virtual circuit" should be --reconfiguring, via rolling over the first virtual circuit--;

Col. 8, claim 12, line 17, "connection resources to establish an incoming path" should be --connection resources, to establish an incoming path--

Signed and Sealed this

Sixteenth Day of January, 2007

JON W. DUDAS
*Director of the United States Patent and Trademark Office*